(12) United States Patent
Beckett et al.

(10) Patent No.: US 11,068,581 B1
(45) Date of Patent: Jul. 20, 2021

(54) TECHNIQUES FOR ESTABLISHING HOST CONNECTIVITY

(71) Applicant: EMC IP Holding Company LLC, Hopkinton, MA (US)

(72) Inventors: Violet S. Beckett, Sutton, MA (US); Narasimha R. Challa, Hudson, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 468 days.

(21) Appl. No.: 15/880,940

(22) Filed: Jan. 26, 2018

(51) Int. Cl.
*G06F 21/44* (2013.01)
*G06F 21/78* (2013.01)
*G06F 12/14* (2006.01)
*G06F 21/31* (2013.01)
*G06F 3/06* (2006.01)

(52) U.S. Cl.
CPC ............. *G06F 21/44* (2013.01); *G06F 3/065* (2013.01); *G06F 3/0622* (2013.01); *G06F 3/0689* (2013.01); *G06F 12/1458* (2013.01); *G06F 21/31* (2013.01); *G06F 21/78* (2013.01)

(58) Field of Classification Search
CPC .......... G06F 21/30; G06F 21/44; G06F 21/62; G06F 21/78; G06F 12/14; G06F 12/1458; H04L 63/10; H04L 63/101; H04L 63/08; H04L 63/083; H04L 63/0876
See application file for complete search history.

(56) References Cited

U.S. PATENT DOCUMENTS

| 6,687,831 | B1 * | 2/2004 | Albaugh | G06F 9/465 709/227 |
| 7,099,904 | B2 * | 8/2006 | Nakatsuka | H04L 29/06 707/781 |
| 7,111,119 | B2 * | 9/2006 | Minowa | G06F 13/385 711/114 |
| 7,191,251 | B2 * | 3/2007 | Watanabe | G06F 3/0608 707/999.102 |
| 7,367,050 | B2 * | 4/2008 | Mitsuoka | H04L 63/083 713/193 |

(Continued)

OTHER PUBLICATIONS

Michael E. Specht, et al., U.S. Appl. No. 15/875,097, filed Jan. 19, 2018, "Data Migration Techniques".

*Primary Examiner* — Zachary A. Davis
(74) *Attorney, Agent, or Firm* — Muirhead and Saturnelli, LLC

(57) ABSTRACT

Techniques for establishing connectivity may include receiving a first login command from an initiator port at a target port; and determining whether the first login command includes valid login authentication information for the initiator port that sent the first login command, and whether the initiator port identifier of the initiator port that sent the first login command includes a key. If the first login command does not include valid login authentication information and the initiator port identifier includes the key, first processing may be performed including: recording first information about the first login command in a registration table; and rejecting the first login command. A second login command may be received from the initiator port at the target port. If the second login command includes valid login authentication information for the initiator port, the second login command may be successfully processed to log the initiator port into the target port.

16 Claims, 10 Drawing Sheets

(56) References Cited

U.S. PATENT DOCUMENTS

| | | | | |
|---|---|---|---|---|
| 7,437,552 | B2* | 10/2008 | Shin | H04L 12/2856 709/220 |
| 7,519,768 | B2* | 4/2009 | Ueoka | G06F 3/0605 711/111 |
| 7,529,884 | B2* | 5/2009 | Nakatsuka | H04L 67/16 711/112 |
| 7,962,672 | B1* | 6/2011 | Martin | G06F 3/0689 710/38 |
| 8,301,812 | B1* | 10/2012 | Riordan | G06F 13/4022 709/225 |
| 8,397,001 | B2* | 3/2013 | Martin | G06F 3/0635 710/38 |
| 10,007,455 | B1* | 6/2018 | George | G06F 3/0637 |
| 2007/0074292 | A1* | 3/2007 | Mimatsu | H04L 63/04 726/26 |
| 2011/0208882 | A1* | 8/2011 | Martin | G06F 3/0605 710/38 |
| 2012/0254554 | A1* | 10/2012 | Nakajima | G06F 3/0607 711/154 |

* cited by examiner

350

| HOST NAME 352 | Key or Secret 354 | Remaining name portion 356 |

TECHNIQUES FOR ESTABLISHING HOST CONNECTIVITY

BACKGROUND

Technical Field

This application generally relates to data storage, and more particularly to techniques used in connection with connectivity, such as between a host and a data storage system.

Description of Related Art

Computer systems may include different resources used by one or more host processors. Resources and host processors in a computer system may be interconnected by one or more communication connections. These resources may include, for example, data storage devices such as those included in the data storage systems manufactured by Dell Inc. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O (input/output) operations in connection with data requests, such as data read and write operations.

Host processor systems may store and retrieve data using a storage system containing a plurality of host interface units, disk drives (or more generally data storage devices or physical storage devices), and disk or storage device interface units. The host systems access the storage device through a plurality of channels provided therewith. Host systems provide data and access control information through the channels to the storage device and the storage device provides data to the host systems also through the channels. The host systems do not address the physical storage devices directly, but rather, access what appears to the host systems as a plurality of logical disk units. The logical units may or may not correspond to the actual physical devices or drives.

An application may execute on a host where the application performs I/O operations. The host may be able to transmit the I/O operations to the data storage system over any one or more different paths or multiple paths. Multipathing functionality, such as for path selection and management of the multiple paths, may be handled by a device driver of the host. When an application on the host issues an I/O operation, it may be received by a device driver of the host which facilitates sending and/or receiving transmissions between the application and the data storage system.

SUMMARY OF THE INVENTION

In accordance with one aspect of techniques herein is a method of establishing connectivity comprising: receiving, at a target port of a data storage system, a first login command from an initiator port of a host, wherein the first login command includes an initiator port identifier identifying the initiator port that sent the first login command, the initiator port identifier including a host name identifying the host and including a key, wherein the first login command does not include valid login authentication information for the initiator port; determining, in accordance with the first login command, whether the first login command includes valid login authentication information for the initiator port and whether the initiator port identifier of the initiator port that sent the first login command includes the key; responsive to determining the first login command does not include valid login authentication information for the initiator port and that the initiator port identifier of the initiator port that sent the first login command includes the key, performing first processing including: recording first information about the first login command in a registration table; and rejecting the first login command, receiving, at the target port of a data storage system, a second login command from the initiator port, wherein the second login command includes the initiator port identifier identifying the initiator port that sent the second login command, the initiator port identifier including the host name identifying the host and including a key, wherein the second login command includes valid login authentication information for the initiator port; determining, in accordance with the second login command, whether the second login command includes valid login authentication information for the initiator port; and responsive to determining the second login command includes valid login authentication information for the initiator port, successfully processing the second login command to log the initiator port into the target port. The method may include automatically determining, using the registration table, an initiator group for the host, the initiator group including the initiator port of the host; and creating, using the registration table, a masking view for the host, wherein the initiator group is included in the masking view of the host. The first information recorded in the registration table may include the initiator port identifier and a target port identifier that identifies the target port that received the first login command. The first information may be associated with the host in accordance with the host name included in the initiator port identifier. The method may include automatically determining, using the registration table, a target port group for the host, the target port group including the target port, wherein the target port group is included in the masking view of the host. The masking view may include a storage group of one or more logical devices. The masking view may be used by the data storage system to determine whether to service received I/O operations. The key may be a user-specified string known to the host and the data storage system. The valid login authentication information for the initiator port may include a secret known to the host and the data storage system.

In accordance with another aspect of techniques herein is a system comprising: one or more processors; and a memory comprising code stored thereon that, when executed, performs a method of establishing connectivity comprising: receiving, at a target port of a data storage system, a first login command from an initiator port of a host, wherein the first login command includes an initiator port identifier identifying the initiator port that sent the first login command, the initiator port identifier including a host name identifying the host and including a key, wherein the first login command does not include valid login authentication information for the initiator port; determining, in accordance with the first login command, whether the first login command includes valid login authentication information for the initiator port and whether the initiator port identifier of the initiator port that sent the first login command includes the key; responsive to determining the first login command does not include valid login authentication information for the initiator port and that the initiator port identifier of the initiator port that sent the first login command includes the key, performing first processing including: recording first information about the first login command in a registration table; and rejecting the first login command; receiving, at the target port of a data storage system, a second login command from the initiator port, wherein the second login command includes the initiator port identifier identifying the initiator port that sent the second login command, the initiator port identifier including the host name identifying the host and including a key, wherein the second login command includes valid login authentication information for the initiator port; determining, in accordance with the second login command, whether the second login command includes valid login authentication information for the initiator port; and responsive to determining the second login command includes valid login authentication information for the initiator port, successfully processing the second login command to log the initiator port into the target port.

In accordance with another aspect of techniques herein is a computer readable medium comprising code stored thereon that, when executed, performs a method of establishing connectivity comprising: receiving, at a target port of a data storage system, a first login command from an initiator port of a host, wherein the first login command includes an initiator port identifier identifying the initiator port that sent the first login command, the initiator port identifier including a host name identifying the host and including a key, wherein the first login command does not include valid login authentication information for the initiator port; determining, in accordance with the first login command, whether the first login command includes valid login authentication information for the initiator port and whether the initiator port identifier of the initiator port that sent the first login command includes the key; responsive to determining the first login command does not include valid login authentication information for the initiator port and that the initiator port identifier of the initiator port that sent the first login command includes the key, performing first processing including: recording first information about the first login command in a registration table; and rejecting the first login command; receiving, at the target port of a data storage system, a second login command from the initiator port, wherein the second login command includes the initiator port identifier identifying the initiator port that sent the second login command, the initiator port identifier including the host name identifying the host and including a key, wherein the second login command includes valid login authentication information for the initiator port; determining, in accordance with the second login command, whether the second login command includes valid login authentication information for the initiator port; and responsive to determining the second login command includes valid login authentication information for the initiator port, successfully processing the second login command to log the initiator port into the target port. The method may include automatically determining, using the registration table, an initiator group for the host, the initiator group including the initiator port of the host; and creating, using the registration table, a masking view for the host, wherein the initiator group is included in the masking view of the host. The first information recorded in the registration table may include the initiator port identifier and a target port identifier that identifies the target port that received the first login command. The first information may be associated with the host in accordance with the host name included in the initiator port identifier. The method may include automatically determining, using the registration table, a target port group for the host, the target port group including the target port, wherein the target port group is included in the masking view of the host. The masking view may include a storage group of one or more logical devices. The masking view may be used by the data storage system to determine whether to service received I/O operations. The key may be a user-specified string known to the host and the data storage system. The valid login authentication information for the initiator port may include a secret known to the host and the data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
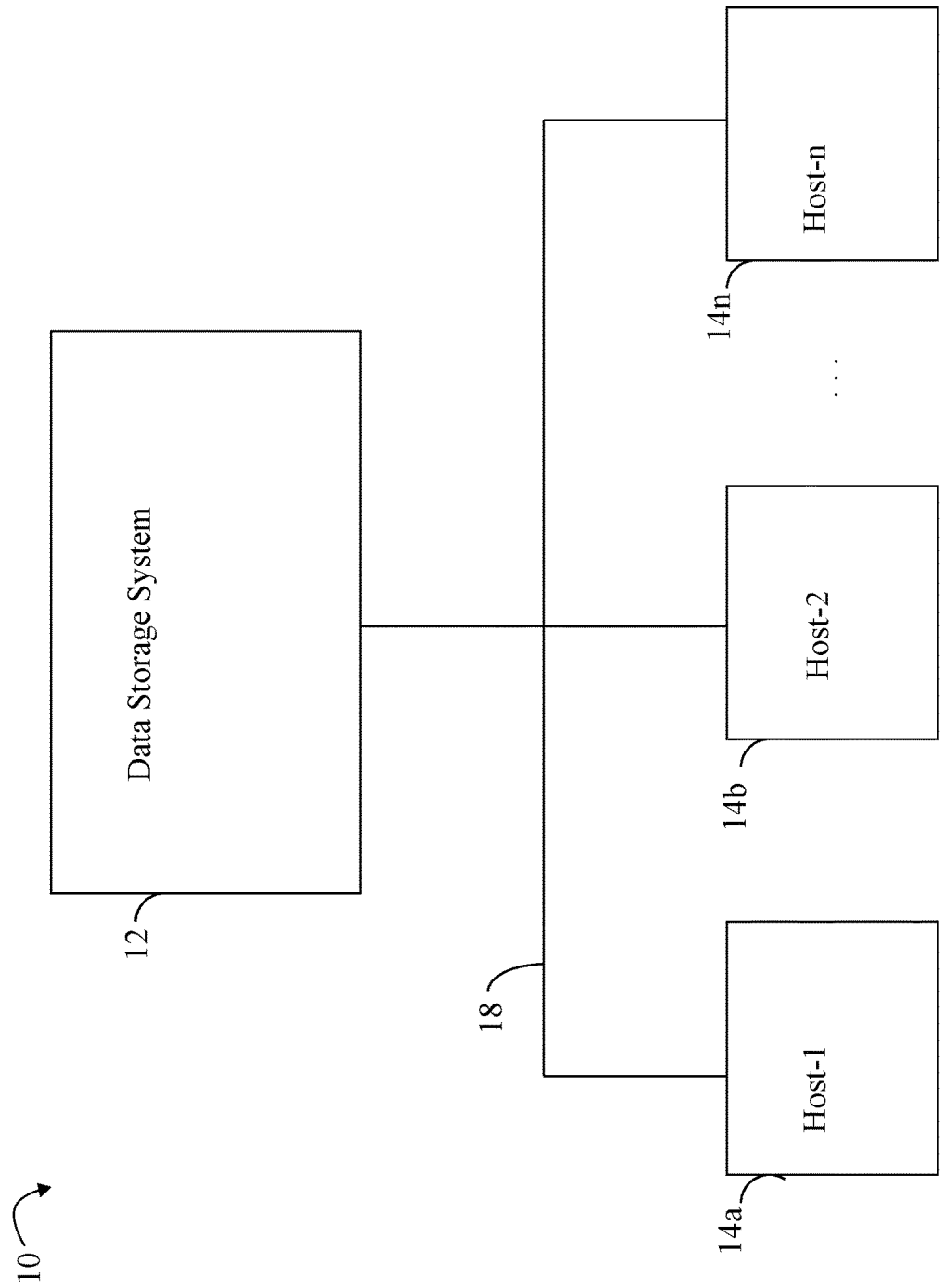
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel (FC) over Ethernet, and the like. Some or all of the connections by which the hosts and data storage system 12 may be connected to the communication medium 18 may pass through other communication devices, or switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array, as well one or more other data storage systems as may vary with the embodiment.

Figure 2A:
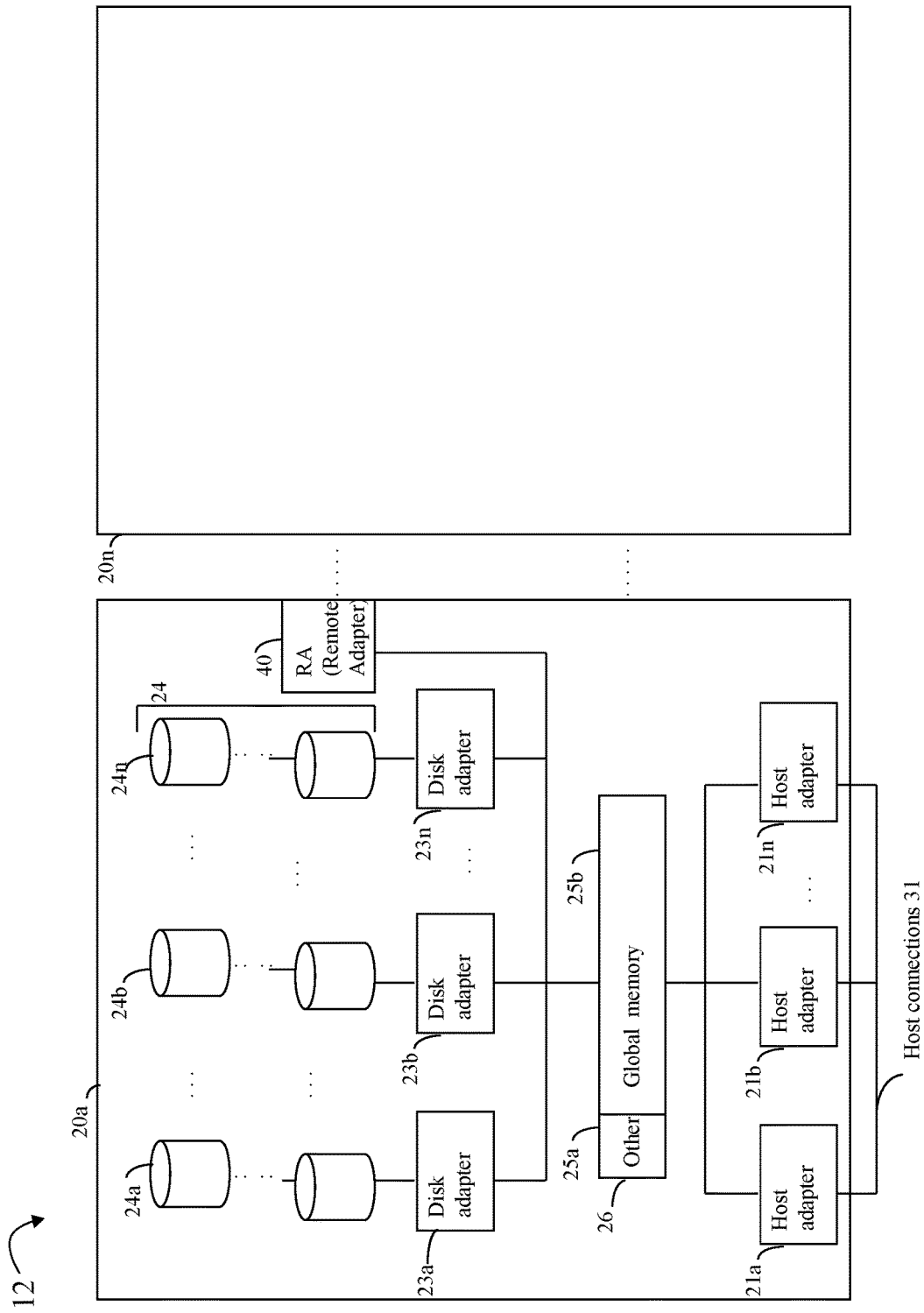
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of suitable back-end non-volatile storage device. For example, physical devices included in an embodiment of a data storage system may include one or more types of rotating disk drives (e.g., SATA (Serial Advanced Technology Attachment), SAS (Serial Attached SCSI), FC 15K RPM (revolutions per minute) FC 10K RPM), one or more types of flash-based storage devices (e.g., SLC (single level cell) flash, MLC (multi-level cell) flash, TLC, (tri-level cell) flash) or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host (e.g., receive host I/O commands and send responses to the host) may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA physically accesses the back-end non-volatile storage devices, such as physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to cache memory (e.g., such as may be included in the component designated as 25b) and marked as write pending. Once written to cache, the host may be notified that the write operation has completed. At a later point in time, the write data may be destaged from cache to the physical storage device, such as the non-volatile physical storage device (PDs of 24) accessed by a DA. In connection with reads, processing may include first looking to see if the requested read data is in cache whereby a read hit occurs. For a read hit, the read is serviced using the cached copy of the requested read data by returning the cached read data to the requester. Thus, with a read hit, there is no need to access the physical (back end) non-volatile storage by the DA to obtain the requested read data thereby resulting in a faster read I/O response time. If the requested read data is not in cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management techniques may be used to maintain the cache, for example, such as in determining how long data remains in cache, whether to prefetch data, selecting data stored in the cache for eviction, and the like.

Figure 2B:
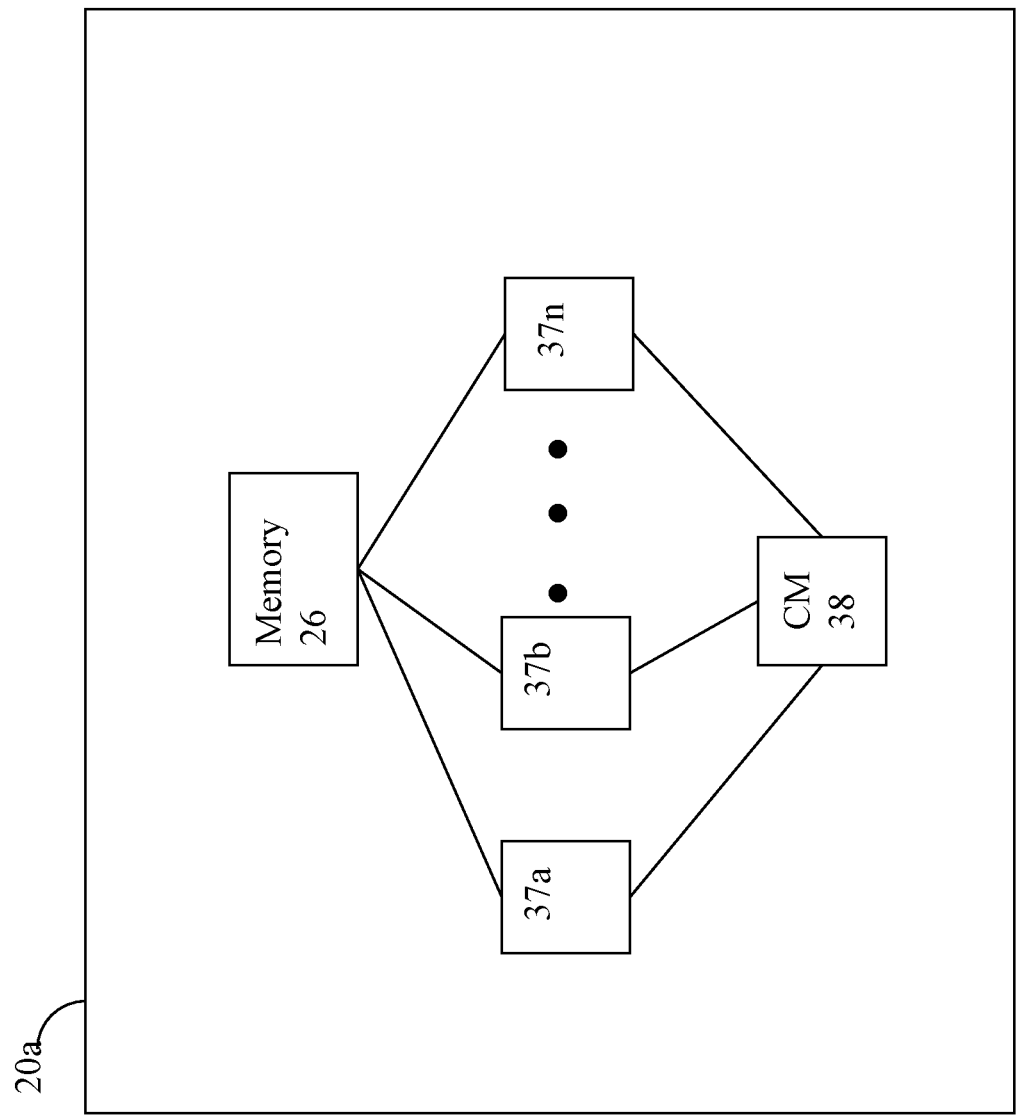
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system.

Figure 3:
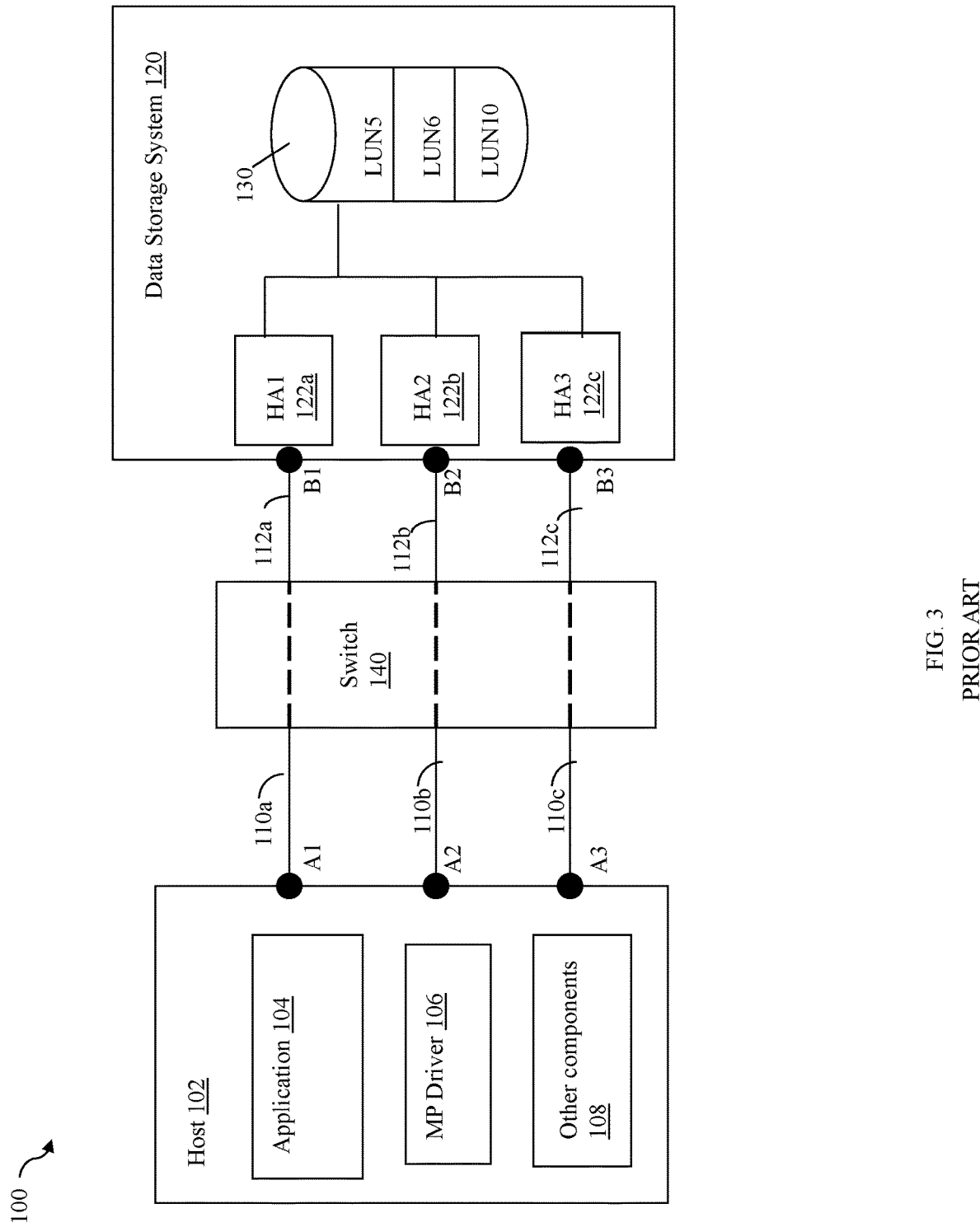
FIGS. 3 and 6 are examples of systems and components that may be used in connection with techniques herein.

Referring to FIG. 3, shown is an example of an embodiment of a system that may be utilized in connection with techniques herein. The example 100 includes a host 102, a switch 140 and a data storage system 120. The host 102 and the data storage system 120 may communicate over one or more paths through the switch 140. The elements 110a-110c denote connections between the host 102 and the switch 140. The elements 112a-112c denote connections between the data storage system 120 and the switch 140. The element 130 may represent a physical device of the data storage system 120 where the physical device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated or sent from the host 102 to the data storage system 120 using the MP driver 106 and one or more other components represented by element 108. The application 104 may be a database or other application which issues data operations, such as I/O operations, where such I/O operations are then transmitted from the host 102 to the data storage system 120. Each of the I/O operations may be directed to a device, such as one of the LUNs of device 130, configured to be accessible to the host 102 over multiple physical paths. As such, each of the I/O operations from the application 104 may be sent from the host 102 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths.

Load balancing may be performed to provide for better resource utilization and increased performance of the host, data storage system, and network or other connection infrastructure. The MP driver 106 may be included in a commercially available product. The host 102 may also include other components 108 such as one or more other layers of software used in connection with sending the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC or SCSI driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4:
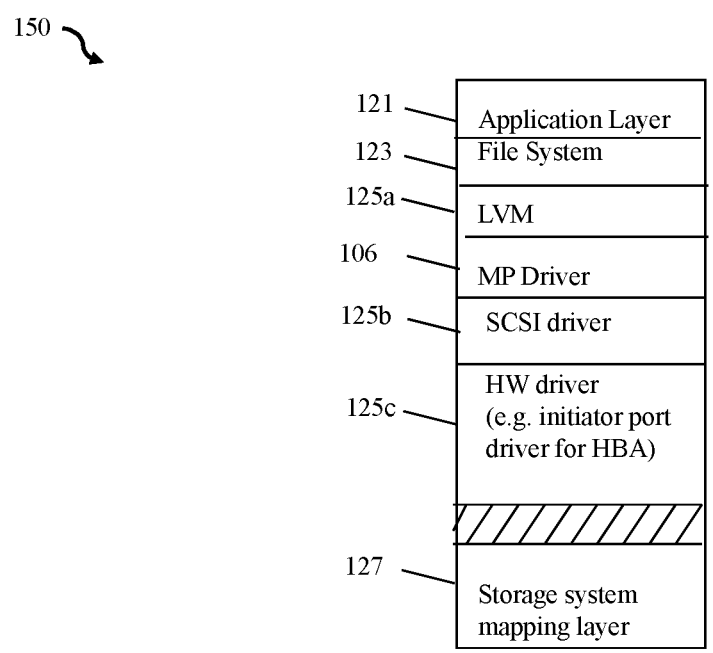
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3.

In an embodiment in accordance with techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. Functionality for performing multipathing operations by multipathing software, such as the MP driver 106, may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI driver 125b and a hardware (HW) driver 125c. The SCSI driver 125b may handle processing of a received I/O request from the MP driver 106 such as forming a request in accordance with the SCSI standard. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a UNIX™ operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a UNIX® operating system as mentioned above, any one of the MICROSOFT WINDOWS® operating systems, a virtualized environment, such as using the VMWARE ESX® hypervisor by VMware, Inc, and the like.

In operation, an application executing at application layer 121 may send one or more I/O operations (e.g., read and write commands or operations) that are directed to logical volumes (implemented by the LVM 125a) or files (implemented using the file system 123). Such I/O operations may be then mapped to data operations directed to LUNs of the data storage system. Such I/O operations from the application layer 121 may be sent to the MP driver 106 after passing through any intervening layers such as layers 123 and 125a. It should be noted that, in some embodiments, the MP driver 106 may also be below the SCSI driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

In an embodiment of a data storage system in accordance with techniques herein, components such as HAs, DAs, and the like, as discussed herein may be implemented using one or more "cores" or processors each having their own memory used for communication between the different front end and back end components rather than utilize a global memory accessible to all storage processors.

Although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a logical block address (LBA) within the defined logical address space of the LUN. The I/O command may include various information such as information that identifies the particular type of I/O command as read or write, information that identifies the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In at least one embodiment in accordance with techniques herein, zoning may be used in combination with masking. Generally, zoning specifies connectivity between the host and data storage system and masking may be used to further control or limit access to particular LUNs.

Masking may be generally characterized as a process performed on the data storage system that indicates which of the LUNs are exposed over which target ports to which initiators. For example target port B1 may be configured to have 100 LUNs attached or mapped to it where the 100 attached LUNs may be potentially exposed to any initiator. The masking information (also referred to herein as mask information, LUN mask information or masking views (MVs)) provides the HAs of the data storage system and their target ports with additional filtering or access control information identifying which of the 100 LUNs are exposed over which of the target ports to which host initiators. For example, with reference to FIG. 3, assume there are 100 LUNs attached or mapped internally in the data storage system to target port B1. In this example, masking information may indicate that only 3 of the 100 LUNs—specifically LUNs 5, 6 and 10—are exposed to each of the initiators A1, A2 and A3 over each of the target ports B1, B2 and B3.

In at least one embodiment in accordance with techniques herein and with reference back to FIG. 3, zoning may be performed with respect to the switch 140, or more generally, network fabric or switching fabric, whereby connectivity between the host 102 and data storage system 120 is specified. In a SAN, zoning may be performed for selectively allowing access to data only to certain users. Essentially, zoning allows an administrator to control who (e.g., which initiator(s)) can see what target ports in a SAN. Using zoning in combination with LUN masking as described herein provides control over who (e.g., what initiator(s)) can see what data/devices (e.g., LUNs) over which target ports in a SAN. Zoning is generally known in the art. Zones may be created by grouping world wide names (WWNs) of host interfaces (e.g., host initiator ports) and data storage system interfaces (e.g., target ports) into zones. The set of zones created may be placed into a zone set which is then activated on the fabric, such as the switching fabric to define the logical connections between host initiators and target ports of the data storage system. Zoning may be performed by issuing requests or commands to the switch. For example, with reference back to FIG. 3, a host initiator may be host initiator port A3 which is zoned to target ports B1, B2 and B3 of the data storage system. Similarly, host initiator ports A1 and A2 may each be zoned to target ports B1, B2 and B3 of the data storage system. Once such zones are created and activated, the various affected ports may be notified by the switching fabric (e.g., via RSCN or registered state change notification in FC protocol) and can perform processing to discover the zoning changes and log into the switch to establish any new connections.

Thus, zoning may be generally characterized as defining logical connections providing connectivity between the various host initiators and target ports. Existing connectivity including a set of logical connections between the host initiators and target ports may be modified by accordingly modifying existing zoning information currently activated or in use by the switching fabric. Such modification may include any of creating a new zone, modifying and/or replacing zoning information of an existing zone, deleting an existing zone, and the like. A zoning modification may be made by issuing appropriate requests to the switching fabric.

In an embodiment in accordance with techniques herein using zoning and masking, zoning of switch 140 may be performed to define the connectivity between the host 102 and data storage system 120 through the switch 140. Masking may then be used by the data storage system to further control which LUNs of the data storage system 120 are exposed, accessible or visible, through which of the target ports B1-B3, to each of the initiators 110a-c of the host 102.

In some existing systems, after zoning of the switch is performed to define the connectivity between the host and data storage system, masking information may be specified and used by the data storage system 120. The masking information specifies which host initiators have access to which LUNs over which target ports of the data storage system 120.

In at least one embodiment in accordance with techniques herein, processing may be performed to define and create masking views specifying masking information. Such techniques may be performed after zoning of the one or more switches (e.g., switching or network fabric) is performed to define connectivity between the host(s) and data storage system(s). In at least one embodiment, a masking view (MV) may be created for each host. Each MV specified for a host may identify what LUNs are accessible to which initiators of the host over which of the target ports of the data storage system. Thus, each instance of an MV associated with a particular host may include a port group (PG), an initiator group (IG), and a device group or storage group (SG). The PG may identify one or more target ports of the data storage system. The IG may identify one or more initiators of the host associated with the MV instance. The SG may identify one or more LUNs. In this manner, the MV associated with a host may denote that the LUNs of the SG are accessible to the initiators (of the host) of the IG over target ports of the PG.

In one embodiment, each initiator and each target port of the data storage system may have an associated WWN and the masking information identifies which initiator WWNs are allowed to access particular LUNs on each target port WWN of the data storage system. In the MV for a host, the IG may identify the WWNs of host initiators and the PG may identify the WWNs of target ports of the data storage system.

In at least one embodiment in accordance with techniques herein, each host may be uniquely identified using an associated HOST NAME. The HOST NAME may be a customer-specified, human-readable name, such as an alphabetic or alphanumeric string providing an easier way for a human to reference or uniquely identify a particular host in a customer system (e.g., such as a customer SAN). In such an embodiment, the MV for a particular host may be associated with, or mapped to, the host's HOST NAME. In this way, the MV of a host may be indexed and accessed using the HOST NAME. Additionally, the HOST NAME may be mapped, indexed, or associated with one or more IP addresses (e.g., network addresses) of the host. An embodiment may therefore provide access to a host's MV through the host's HOST NAME and/or one or more of the host's network addresses that are mapped or associated with the HOST NAME.

Figure 5A:
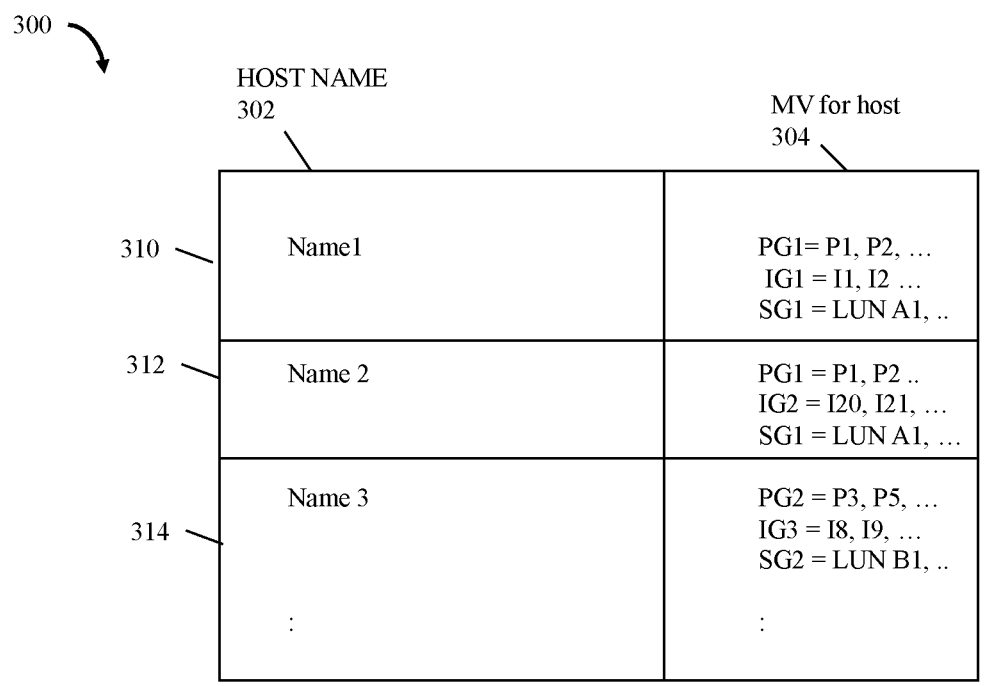
FIG. 5A is an example of information that may be included in a masking view defined for hosts in an embodiment in accordance with techniques herein.

Referring to FIG. 5A, shown is an example of masking information that may be created and used in an embodiment in accordance with techniques herein. In the example 300, shown is a table of MVs for a plurality of hosts. Each row of the table denotes an MV instance in column 304 configured for a particular host identified in column 302 of the same row. The table 300 may index or provide access to MVs using the host's unique HOST NAME (column 302) as described elsewhere herein. For example, consider an embodiment in which the table 300 is indexed and accessed by HOST NAME in column 302. (e.g., Each host's HOST NAME denoted in column 302 uniquely identifies a particular host). Generally, the example 300 uses the notation PGn, n being an integer greater than 0, to identify an instance of a PG; uses the notation IGn to identify an instance of an IG; and uses the notation SGn to identify an instance of a SG. In a PG, Pn may denote a target port WWPN. In an IG, In may denote an initiator WWPN.

Row 310 may denote a first host having a HOST NAME of Name 1 (as in column 302 of row 310) with an MV as specified in column 304 of row 310. As illustrated in column 304 of row 310, the first host has a first MV including port group PG1, initiator group IG1, and storage group SG1. Row 312 may denote a second host having a HOST NAME of Name 2 (as in column 302 of row 312) with an MV as specified in column 304 of row 312. As illustrated in column 304 of row 312, the second host has a second MV including port group PG1, initiator group IG2, and storage group SG1. Note that SGs and PGs may be defined and reused in different MV instances for different hosts. For example, PG1 may be defined as a set of target ports of the data storage system and SG1 may be defined as a set of particular LUNs where both PG1 and SG1 are used in the MVs of rows 310 and 312. Row 314 may denote a third host having a HOST NAME of Name 3 (as in column 302 of row 314) with an MV as specified in column 304 of row 314. As illustrated in column 304 of row 314, the third host has a third MV including port group PG2, initiator group IG3, and storage group SG2.

In at least one embodiment in accordance with techniques herein, the host may perform processing, such as when the host is booted, to discover and establish connectivity between the host and data storage system. In particular, the host may perform processing to discover and establish connectivity with the switch (e.g., more generally network or switching fabric) and also between the switch and data storage system. For example, an HBA initiator port of a host may log into the switch and provide identifying information of the initiator port, such as the initiator port's WWN. The switch may provide the initiator port with information regarding what data storage system target ports are visible or exposed from the switch. In turn, the host initiator port may then proceed to login to the target ports of the data storage system where the host initiator port provides its WWN along with possibly other configuration information, such as the HOST NAME, sent during the login.

In at least one embodiment in accordance with techniques herein, one or more hosts may communicate with one or more data storage systems in accordance with a protocol, such as the iSCSI protocol, which uses an additional authentication protocol in enabling and establishing connectivity used for host-data storage system communication. For example, the iSCSI protocol used in at least one embodiment in accordance with techniques herein may use the Challenge-Handshake Authentication Protocol (CHAP) to authenticate or validate a network host to a data storage system. In such an embodiment, CHAP authentication information, such as authentication credentials including the CHAP secret described below, is required in connection with login information provided by a host initiator port attempting to login to a target port of the data storage system.

As known in the art, CHAP is an authentication scheme used by Point to Point Protocol (PPP) servers to validate the identity of remote clients. CHAP periodically verifies the identity of the client by using a three-way handshake. This happens at the time of establishing the initial link (LCP (link control protocol)), and may happen again at any time afterwards. The verification is based on a shared secret (such as the client's password). CHAP authentication uses a challenge and response, which means that the peer (authenticator, such as data storage system) challenges the caller (such as host initiator) to prove its identity. The challenge may include, for example, a random number and a unique ID that is generated by the authenticator. The caller uses the ID, random number, and its CHAP security credentials to generate the proper response (handshake) to send to the peer. CHAP security credentials include a CHAP user name and a CHAP "secret." The CHAP secret is an arbitrary string that is known to both the caller (e.g., data storage system) and the peer (e.g., host, host initiator) before they negotiate a PPP link. Thus, CHAP requires that both the client, such as the host, and the data storage system know the CHAP secret although it is not sent over the network. Following is a summary of processing that may be performed using the CHAP authentication scheme:

1. After the completion of the link establishment phase, the authenticator (e.g., data storage system) sends a "challenge" message to the peer (e.g., host, host initiator).

2. The peer responds with a value calculated using a one-way hash function on the challenge and the secret combined.

3. The authenticator checks the response against its own calculation of the expected hash value. If the values match, the authenticator acknowledges the authentication; otherwise it should terminate the connection.

4. At random intervals the authenticator may send a new challenge to the peer and repeat the steps 1 through 3 as described above.

Thus, in a system using the iSCSI protocol with CHAP authentication, each of the host initiator ports may be required to provide CHAP authentication information in connection with each login command sent to a target port of the data storage system. In such a system, the data storage system is configured with the CHAP authentication information prior to the host initiator port login command being received by the data storage system. In other words, the data storage system is configured with the valid or expected CHAP authentication information (e.g., that will be recognized by the data storage system as valid) in order to establish connectivity with the target ports of the data storage system.

In at least one existing system not using techniques herein, where such a system operates in accordance with the iSCSI protocol using CHAP authentication, the user first manually creates the needed infrastructure (e.g., IGs, PGs, SGs, host MVs) on the data storage system and supplies, such as via manual data entry, the needed CHAP information that will be recognized for enabling host initiator port logins. One problem with such existing systems not using techniques herein is that in order to define the IG, manual data entry (e.g., typing) is performed to specify the WWNs of the host initiator ports of the IG, whereby such manual data entry tends to be an error prone process. Typically, such WWNs include numerous characters, hex digits, and the like.

Described below are techniques that may be used in at least one embodiment to automatically define and create the IG. Such techniques may include automatically obtaining information regarding the WWNs of the host initiator ports included in the IG. Furthermore, such techniques may facilitate automatically defining and creating PGs, SGs and/or MVs of the different hosts communicating with the data storage system. In at least one embodiment in accordance with techniques herein, the host and data storage system may communicate in accordance with the iSCSI protocol. However, as will be appreciated by those skilled in the art, techniques described herein are more generally applicable for use with other suitable protocols and generally not limited to the particulars of embodiments described herein for illustration.

In an embodiment in accordance with techniques herein with reference back to FIG. 3, the network and illustrated components may be in the process of initializing and starting up whereby the zoning has completed and the host may be in the process of performing its initialization processing. Once zoning of the switch 140 is complete whereby the host 102 has connectivity defined by such zoning to the data storage system 120, the host 102 (as part of its initialization) may send login commands to the data storage system 120. More specifically, the host 102 may send a login command on each path or unique combination of initiator (e.g., host HBA) and target port. For example, assume that connectivity has been zoned in the switch 140 for paths between each unique pair of initiator and target port or 9 paths zoned between the host and data storage system 120 as follows: A1-B1, A1-B2, A1-B3, A2-B1, A2-B2, A2-B3, A3-B1, A3-B2, and A3-B3. The host 102 (e.g., the MP driver of the host 102) may send a login command from the host 102 to the data storage system 120 over each of the foregoing 9 paths to log into each of the target ports B1, B2, B3 of the data storage system. In at least one embodiment, each of the login commands may be an iSCSI command directed to a target port of the data storage system. It should be noted that the login command may be directed to a target port of the data storage system rather than a LUN because, at this point in system startup, no LUNs may be defined or have storage provisioned on the data storage system. As an alternative, an embodiment may direct the login command issued from a host initiator to a target port to a particular LUN and thereby establish connectivity over that particular path (e.g., initiator and target port) for use with the particular LUN specified in the login command.

In at least one embodiment in accordance with techniques herein, each login command sent from an initiator HBA port of the host 102 includes login information. The login information may include the WWN of the host initiator port sending the login command. In at least one embodiment, with reference to the example 350 of FIG. 5B, the host initiator port WWN may be configurable by a customer where the WWN may include:

the HOST NAME 352 uniquely identifying the particular host that includes the host initiator port sending the login command;

a key or secret 354; and a remaining name portion 356 denoting the remaining portion of the WWN.

Figure 5B:
FIG. 5B is an example representation of information that may be included in a world-wide name of a host initiator port in an embodiment in accordance with techniques herein.

It should be noted that the information represented by 352, 354 and 356 may be generally located in any position in the WWN and is not required to be placed in the particular relative positions depicted in FIG. 5B. Generally, the particular format and layout of information in the formed WWN denoted in FIG. 5B may be defined, whereby processing performed on the host and data storage system may be in accordance with the defined format and layout. More generally, a WWN, such as associated with a particular host initiator port or target port, may also be referred to an identifier (ID) (e.g., host initiator port WWN or ID, target port WWN or ID).

The HOST NAME 352 may be the HOST NAME such as described elsewhere herein (e.g., in connection with FIG. 5A). In at least one embodiment in accordance with techniques herein, the key or secret 354 may be a selected string, such as a customer-specified string, used as an indicator to trigger special additional processing on the data storage system in accordance with techniques herein as described in following paragraphs. In particular, responsive to receiving a login command at a target port of the data storage system, presence of the key or secret 354 in the initiator port WWN may indicate that the data storage system performs processing including rejecting or failing the login command attempt and additionally recording information conveyed using the login command in a registration table. The processing may include recording the initiator port WWN along with the WWN of the target port at which login command is received. Additionally, the processing may include extracting the target LUN specified in the login command and, in the registration table, associating the target LUN with the foregoing recorded initiator port WWN and WWN of the target port. Thus, an embodiment in accordance with techniques herein may automatically and programmatically (e.g., by executing code) define the IG for the MV for host 102 using the login command information. More specifically, processing may be performed on the data storage system 120 to process the login command information received with login commands to form an IG for the host 102 having the HOST NAME. For each login command received from an host initiator port, where the initiator port's WWN identifies HOST NAME as the sending host including the initiator port, that initiator port's WWN may be included in the IG for the host 102. In this manner, processing may be performed, such as on the data storage system, to automatically form sets of IGs by grouping and associating initiator WWNs having a common or the same HOST NAME. Additionally, such processing may be triggered via the data storage system initially recognizing the use of the special indicator, such as the secret or key 354 also included in the host initiator port's WWN. Such techniques herein may reject the login command but use information conveyed with the rejected login command to record information in a registration table on the data storage system. As just described, the recorded information may include an entry for each such login command received where the entry records the host initiator port's WWN along with the WWN of the target data storage system port that received the login command. Furthermore, the data storage system may automatically group or associate multiple entries of the registration table with a common host where each such entry include the same HOST NAME in the host initiator WWN.

At this point, the IG for host 102 may be automatically formed as described above and associated with the HOST NAME of the host 102. Additionally, processing may also be automatically performed to define a PG for host 102 and its associated IG where the PG includes the one or more target ports of the data storage system which received one of the login commands from an initiator of the IG. For example, as noted above with reference back to FIG. 3, 9 login commands may sent from the host 102 to the data storage system 120. The IG for MV of host 102 may include A1, A2 and A3 since each of these initiator ports sent 3 login commands to each of the 3 target ports B1, B2 and B3, and login information of such commands identified the same HOST NAME (uniquely identifying host 102) as the host including the initiator ports that sent the commands. The PG for the MV of host 102 may be the set of target ports of the data storage system that received a login command sent by one of the initiator ports in the IG for host 102. In this example, the 3 target ports B1, B2, and B3 form the PG for host 102.

In at least one embodiment in accordance with techniques herein such as described above in connection with FIG. 3, each initiator of host 102 may be zoned to use the same set of target ports B1, B2 and B3. However, it may be that not all initiators of the IG for the host actually login, or issue login commands to, the same set of target ports of the data storage system. In this latter case, even if not all initiator ports of the IG actually register on the same set of target ports, the PG may be formed as the set which is the union of all target ports that receive a login command from an initiator of the IG. Note that in such a case, if a particular target port of the PG is not zoned for a particular initiator, then the particular initiator will be restricted and only allowed to send commands to its zoned target ports.

At this point, a MV may be defined for the host 102 where the MV includes the IG and PG formed as described above based on the login commands received on the data storage system. The SGs for the MVs also are specified using any suitable technique. For example, in at least one embodiment in which a login command issued from a host initiator to a target port is directed to a particular LUN, an SG may be formed using the LUNs specified in each of the login commands. For example, a first login command may be issued over path A1-B1 to LUN 5 and a second login command may be issued over path A1-B1 to LUN 6. Using the foregoing, the IG may include A1, the PG may include B2 and the SG may include LUNs 5 and 6.

As a variation to the foregoing, an embodiment may provide for a user to specify or define SGs manually, such as using data storage system management software. As yet another option, an embodiment may automatically and initially define a default SG for each MV whereby the default SG may include a single default LUN. Subsequently, the user may modify the default SG created for an MV. In this manner, the data storage system 120 may use an MV for a host to further limit access over one or more particular paths to one or more particular LUNs included in an SG.

Figure 6:
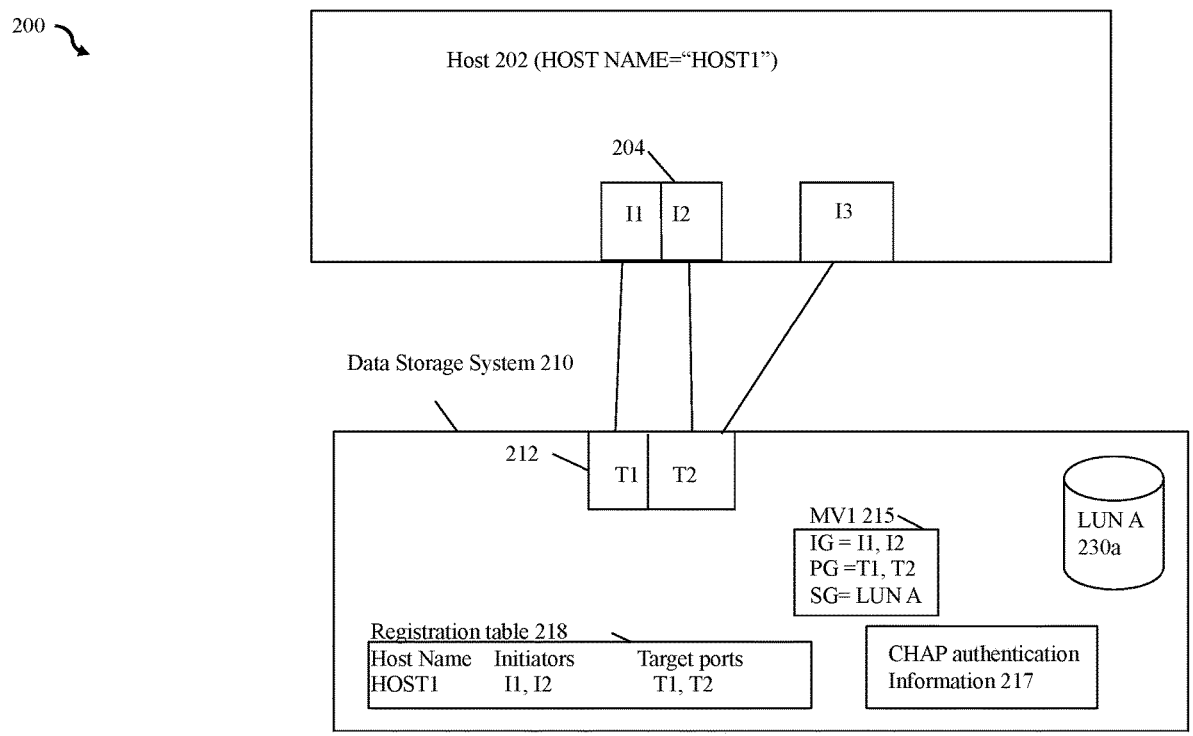
Figure 7A:
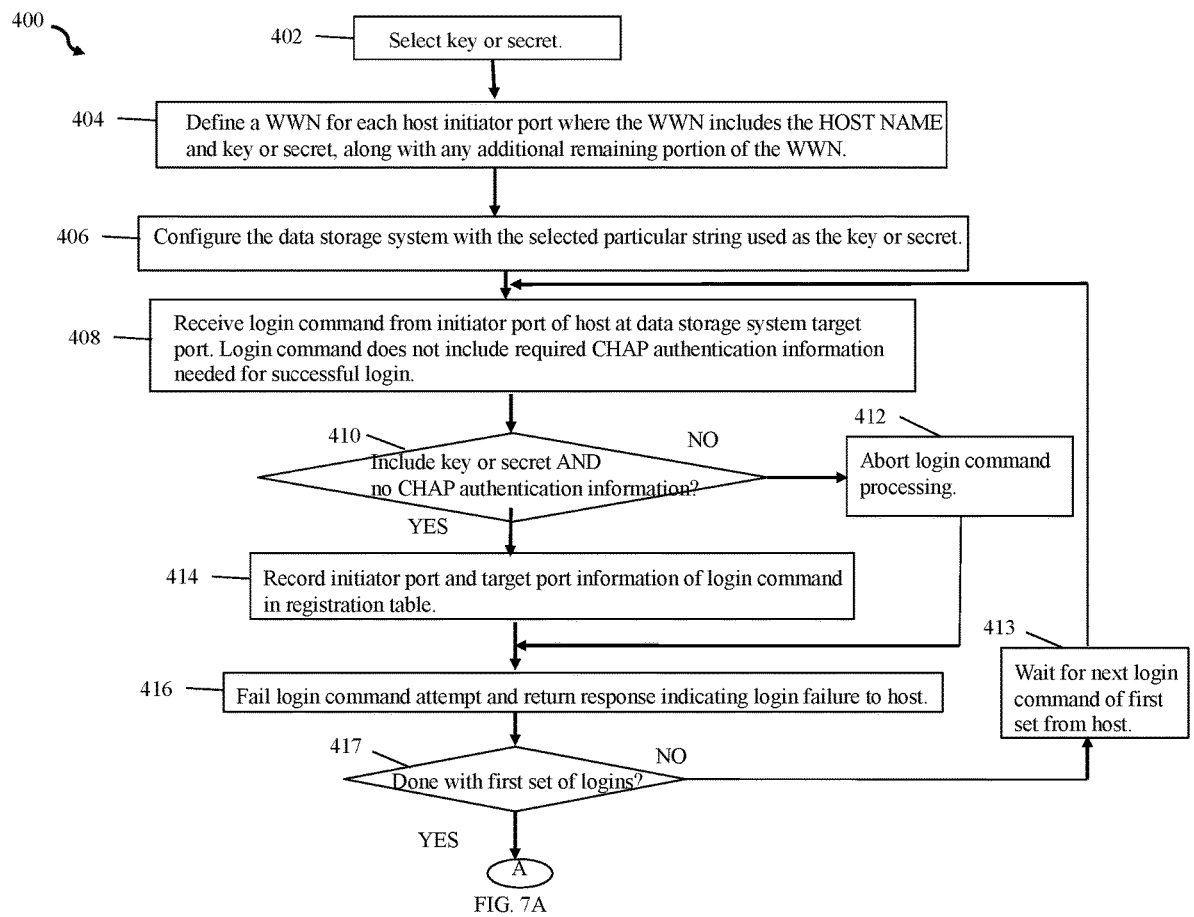
FIGS. 7A and 7B are flowcharts of processing steps that may be performed in an embodiment in accordance with techniques herein.
Figure 7B:
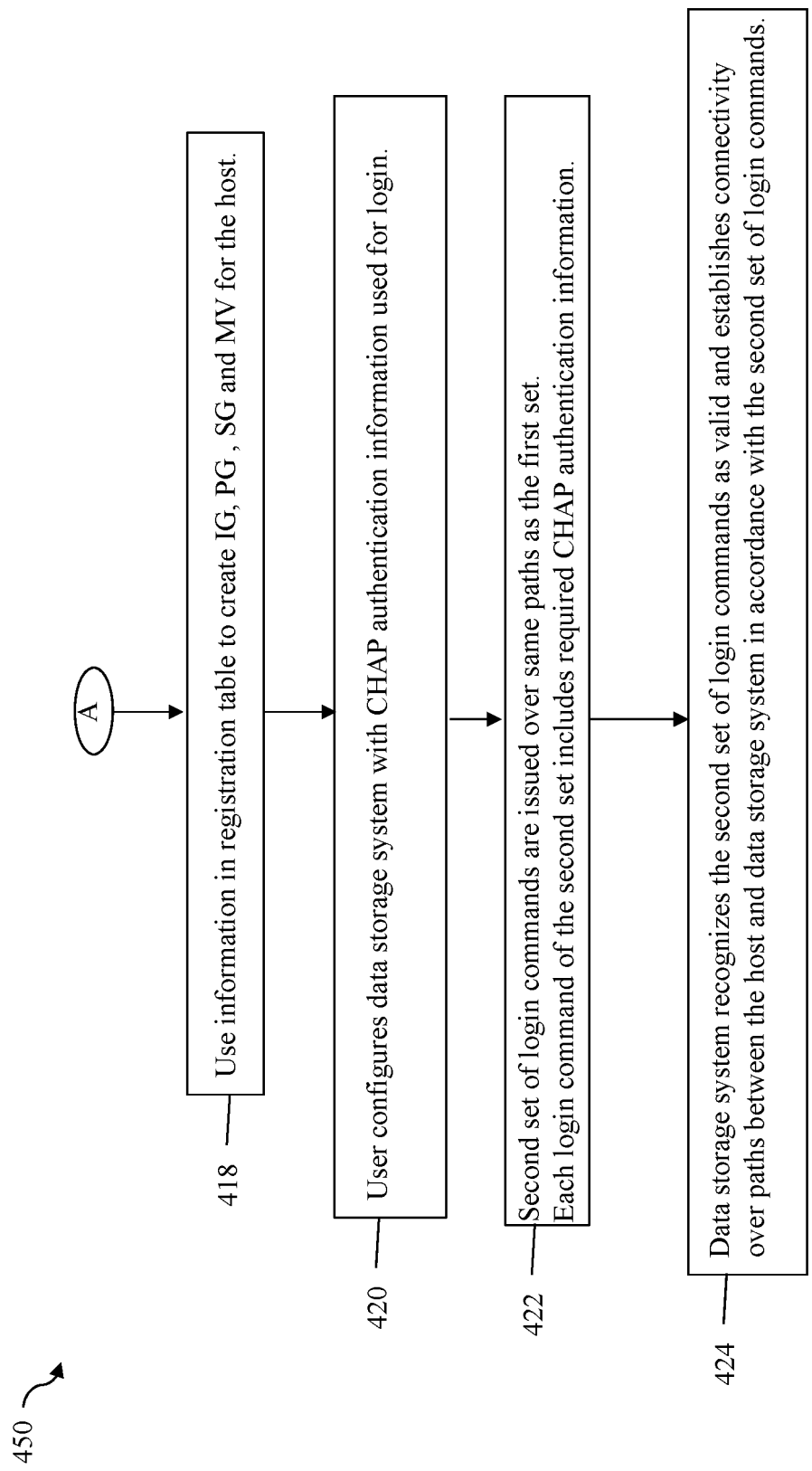

To further illustrate, reference is made to the example 200 of FIG. 6 and also the flowcharts 400, 450 of FIGS. 7A and 7B. The example 200 includes host 202, and data storage system 210. The host 202 is similar to other hosts, such as host 102, as described herein. The data storage system 210 is similar to other data storage systems as described herein. In this example, for simplicity, only a single LUN A 230a is illustrated in the data storage system 210 although in actual systems there may be many more LUNs. The host 202 may have a HOST NAME of HOST1. Host 202 may include t initiator ports, I1 and I2. The data storage system 210 may include f target ports T1, T2. In this example, two paths are defined between the host 202 and the data storage system 210: a first path, I1-T1; and a second path I2-T2. LUN A 230a may be exposed or visible over the foregoing t paths.

Consistent with discussion herein and as described in more detail below, techniques herein include sending a first set of login commands from the host 202 to the data storage system 210 over paths that will be configured for connectivity over which LUN A 230a will be accessed. In this example, the first set of login commands includes t login commands sent, respectively, over the two paths I1-T1 and I2-T2. The first set of login commands do not include required CHAP authentication information and will be failed or rejected by the data storage system as unsuccessful login attempts. However, the data storage system receives the first set of login commands for processing, extracts desired information from the first set of login commands, and records the extracted information in the registration table 218. Subsequently the information in the registration table may be used to automatically create at least the IG for the host 202. In at least one embodiment, the information in the registration table may also be used to automatically configure the PG for the host 202. Consistent with discussion elsewhere herein, the SG for the host 202 may be formed using login commands directed to LUN A and/or manually having a user-specified SG. Subsequently, the MV 215 for the host 202 may be defined using the foregoing IG, PG and SG. The user may configure the data storage system with the CHAP authentication information 217 to use for subsequently issued login commands issued over paths I1-T1 and I2-T2 consistent with the MV 215. At this point, once the MV 215 for host 202 has been created and the CHAP authentication information 217 provided to the data storage system, a second set of login commands may be issued by the host 202 to the data storage system 210. The second set of login commands from the host 202 to the data storage system 210 is issued over paths that will be configured for connectivity over which LUN A 230a will be accessed. In this particular example, the second set of login commands includes t login commands issued over the same two paths I1-T1 and I2-T2 (as previously issued in the first set). Each login command of the second set includes the host initiator port WWN (e.g., as provided in connection with the first set of the login commands) and additionally includes the required CHAP authentication information. As a result, the second set of login commands will be successfully processed to establish connectivity over paths I1-T1 and I2-T2 to access LUN A 230a.

The foregoing processing is now further described with reference to FIGS. 7A and 7B as well as FIG. 6. In step 402, a string may be selected as the key or secret 354. Step 402 may include a customer configuring a selected string as the key or secret, for example, using a user interface (UI) on the host. From step 402, control proceeds to step 404. In step 404, processing is performed to define a WWN for each host initiator port I1, I2. Each of the two WWNs for I1 and I2 includes the HOST NAME of HOST 1 and the key or secret. Additionally, each initiator port WWN may also include an additional remaining portion of other information. From step 404 control proceeds to step 406 where the data storage system 210 is configured with the selected particular string used as the key or secret. In other words, step 406 includes providing the data storage system with the particular string selected by the user as the key or secret in step 404. The string selected as the key or secret may be configured and stored on the data storage system 210, for example, using a UI of the data storage system. At this point in processing, information denoted by elements 215, 217 and 218 are not yet populated and not in existence on the data storage system 210. The processing loop formed by steps 408, 410, 414, 416 and 417 denote processing associated with the first set of login commands sent as described above.

From step 406, control proceeds to step 408. At step 408, a login command of the first set is sent from an initiator port of the host to a target port of the data storage system where the login command is received by the target port for processing by the data storage system. For example, the host may send a first login command over path I1-T1 where the first login command does not include required CHAP authentication information needed for successful login. However, consistent with discussion herein, the first login command does include the WWN of I1, the sending host initiator port. From step 408, control proceeds to step 410. At step 410, the received first login command is processed on the data storage system where such processing includes determining whether the login command information includes any CHAP authentication information and whether the login command information includes a WWN of the sending initiator I1, where I1's WWN includes the key or secret. If step 410 evaluates to no, (e.g., whereby the login command does not include valid recognized CHAP authentication information and also does not include the key or secret in the initiator port's WWN), control proceeds to step 412 where processing of the login command is aborted. From step 412, control proceeds to step 416 where a response is returned to the host indicating login command failure.

If step 410 evaluates to yes, control proceeds to step 414. In this particular example, the first login command does not include any (e.g., or any valid recognized) CHAP authentication information and the first login command is recognized as having a sending initiator WWN for I1 that includes the key or secret whereby processing proceeds to step 414. At step 414, the data storage system records information in the registration table 218 regarding the WWN of the initiator port (that sent the first login command) and the WWN target port (that received the first login command). Additionally, such processing may associate the WWN of the initiator port I1 and the WWN of the target port T1 with the HOST NAME of "HOST 1" embedded in the initiator port I1's WWN. From step 414, control proceeds to step 416 where the first login command is failed and a response is returned to I1 indicating the login failure. From step 416, control proceeds to step 417. At step 417, a determination is made as to whether all login commands of the first set have been sent by the host and received by the data storage system. If step 417 evaluates to no, control proceeds to step 413 where the data storage system waits for the next login command of first set from the host. From step 413, control proceeds to step 408 where the next login command of the first set is sent by the host, and subsequently received for processing by the data storage system. If step 417 evaluates to yes, control proceeds to step 418.

In this particular example, control returns to step 408 where the last login command of the first set is sent over path I2-T2 and then subsequently processed in steps 410, 414 and 416. At this point for this particular example, step 417 evaluates to yes and control proceeds to step 418. At this point, the registration table 218 may be as illustrated in table 218 where the specified initiator ports I1, I2 and target ports T1, T2 are associated with HOST 1. At step 418, information in the registration table 218 may be used to automatically create an IG=I1, I2 and a PG=T1, T2. Additionally in step 418, the SG=LUN A may also be created automatically as a result of the login command information and/or manually. Subsequently, step 418 may also include creating the MV 215 for the host 202 from the foregoing IG, PG and SG. From step 418, control proceeds to step 420 where the user configures (e.g., provides) the data storage system with the CHAP authentication information 217 to be used in connection with login commands from host 202. At step 422, the second set of login commands are issued over the same two paths as noted above. Each login command of the second set includes the required CHAP authentication information. From step 422, control proceeds to step 424 where the data storage system recognizes the second set of login commands as valid and establishes connectivity over the two paths I1-T1 and I2-T2 between the host and data storage system in accordance with the second set of login commands. As a result of step 424, LUN A 230*a* is accessible to the host 202 over paths I1-T1 and I2-T2 in accordance with the MV 215.

It should be noted that at a later point in time, an additional new host initiator port may be added to the host 202. In a first case, it may be that the customer has decided that all initiators of the host 202 will use the same CHAP authentication information, such as including the same CHAP secret. For example, assume that initiator port I3 is added to host 202 whereby a single additional path I3-T2 is zoned and configured over which LUN A 230*a* is exposed. In this first case, a login command may be issued over I3-T2 which includes the required CHAP authentication information. The received login command may be processed as described in step 424 where the login is recognized as valid and establishes the connectivity I3-T2 over which LUN A is accessible to host 202. The new initiator port I3 is added to the IG of MV 215 for HOST1, host 202 (e.g., the WWN for the initiator port I3 includes the HOST NAME="HOST1" embedded therein and incorporated into the MV 215 for HOST1, host 202).

In a second case, it may be that the customer has decided that, for example, the newly added initiator port I3 has its own set of CHAP information (e.g., may use its own CHAP secret per host initiator port). In this second case, processing as described in FIGS. 7A and 7B may be performed with respect to establishing desired connectivity (e.g., one or more paths including I3) between the host 202 and data storage system 210. In this second case, the customer may configure the data storage system to have the required additional set of CHAP information used by I3.

Consistent with discussion herein, MVs as described herein may be used by the data storage system to determine whether to service an I/O directed to a LUN where the I/O is sent from a particular initiator of a host to a particular target port of the data storage system. Thus, in one aspect the MV indicates what received I/O operations are allowable and may be serviced by the data storage system. The MV indicates the I/O is allowable and may be serviced if: the I/O is directed to a LUN included in the SG of the MV, the I/O is sent from an initiator of an IG of the MV, and the I/O is received at a target port of the PG of the MV.

Also consistent with discussion herein, processing is described where the MV for a host may be automatically created using information from the registration table. For example, as discussed above, the IG, PG and SG may be automatically created using information from the login commands whereby the MV may also be automatically created for the host using the foregoing IG, PG and SG. As a first variation, at least the IG and PG may be automatically formed as described herein. In this first variation, the SG may be formed using any other suitable means such as via customer creation by issuing commands using a management application interface (e.g., graphical user interface, command line interface, and the like) of the data storage system. Additionally, in this first variation, the customer may also now create the MV for the host where the MV includes the automatically formed IG and PG as well as the SG formed using the management application interface. As yet a second variation, only the IG may be automatically formed as described herein. In this second variation, the PG and SG may be formed using any other suitable means such as via customer creation by issuing commands using the management application interface of the data storage system. Additionally, in this second variation, the customer may also now create the PG, SG and subsequently the MV for the host where the MV includes the automatically formed IG as well as the PG and SG created using the management application interface. As further yet a third variation, none of the IG, PG, SG and MV may be automatically formed as described herein. In this third variation, information of the registration table 218 may be used by the customer to manually create, such as by issuing commands using the management application interface, the desired IG, PG, SG and MV for a host. For example, it may be desirable to create an IG for the host which only includes I1, only includes I2, or generally includes a set of one or more host initiator ports that is not equal to all the particular host's initiator ports specified in the table 218. In this third variation, the registration table 218 may be consumed or used as an input, for example, to the management application whereby the user selects particular initiator ports from the table 218 in forming the desired IG, selects particular target ports from the table 218 in forming the desired PG, and the like. Thus, as appreciated by those skilled in the art, the registration table 218 may be used in connection with various desired levels of automation and/or manual entry in connection with creating the desired IG, PG, SG and/or MV for each host.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of establishing connectivity comprising:
   determining a key associated with a host, wherein the key is a user configured string or secret known to the host and a data storage system;
   determining a host name uniquely identifying the host;
   providing the data storage system with the key associated with the host;
   configuring an initiator port identifier that identifies an initiator port of the host, wherein the initiator port identifier includes the key as a first portion and the host name as a second additional portion;
   subsequent to providing the key associated with the host to the data storage system, receiving, at a target port of a data storage system, a first login command from the initiator port of the host, wherein the first login command includes the initiator port identifier identifying the initiator port that sent the first login command, wherein the initiator port identifier of the first login command includes the host name uniquely identifying the host and includes the key, wherein the first login command does not include valid login authentication information for the initiator port;
   responsive to the data storage system (a) receiving the first login command, (b) determining that the initiator port identifier of the first login command includes the key, and (c) determining that the first login command does not include valid login authentication information for the initiator port, performing first processing including:

recording first information about the first login command in a registration table; and
rejecting the first login command;
subsequent to completing the first processing, receiving, at the target port of the data storage system, a second login command from the initiator port, wherein the second login command includes the initiator port identifier identifying the initiator port that sent the first login command and the second login command, wherein the initiator port identifier of the second login command includes the host name identifying the host and includes the key, wherein the second login command includes valid login authentication information for the initiator port; and
responsive to receiving the second login command that includes valid login authentication information for the initiator port, successfully processing the second login command to log the initiator port into the target port.

2. The method of claim 1, further comprising:
automatically determining, using the registration table, an initiator group for the host, the initiator group including the initiator port of the host; and
creating, using the registration table, a masking view for the host, wherein the initiator group is included in the masking view of the host.

3. The method of claim 2, wherein the first information recorded in the registration table includes the initiator port identifier and a target port identifier that identifies the target port that received the first login command, wherein the first information is associated with the host in accordance with the host name included in the initiator port identifier.

4. The method of claim 3, further comprising:
automatically determining, using the registration table, a target port group for the host, the target port group including the target port, wherein the target port group is included in the masking view of the host.

5. The method of claim 4, wherein the masking view includes a storage group of one or more logical devices.

6. The method of claim 5, wherein the masking view is used by the data storage system to determine whether to service received I/O operations.

7. The method of claim 1, wherein the valid login authentication information for the initiator port includes a secret known to the host and the data storage system.

8. The method of claim 1, wherein the initiator port is a first initiator port of the host, and wherein the method further comprises:
configuring a second initiator port identifier that identifies a second initiator port of the host, wherein the second initiator port identifier includes the key as a first portion and the host name as a second additional portion;
receiving, at the target port of the data storage system, a third login command from the second initiator port, wherein the third login command includes the second initiator port identifier, wherein the third login command does not include valid login authentication information for the second initiator port;
responsive to the data storage system (a) receiving the third login command, (b) determining that the second initiator port identifier of the third login command includes the key, and (c) determining that the third login command does not include valid login authentication information for the second initiator port, performing second processing including:
recording second information about the third login command in the registration table; and
rejecting the third login command;
subsequent to completing the second processing, receiving, at the target port of the data storage system, a fourth login command from the second initiator port, wherein the fourth login command includes the second initiator port identifier, wherein the fourth login command includes valid login authentication information for the second initiator port; and
responsive to receiving the fourth login command that includes valid login authentication information for the second initiator port, successfully processing the fourth login command to log the second initiator port into the target port.

9. A system comprising:
one or more processors; and
a memory comprising code stored thereon that, when executed, performs a method of establishing connectivity comprising:
determining a key associated with a host, wherein the key is a user configured string or secret known to the host and a data storage system;
determining a host name uniquely identifying the host;
providing the data storage system with the key associated with the host;
configuring an initiator port identifier that identifies an initiator port of the host, wherein the initiator port identifier includes the key as a first portion and the host name as a second additional portion;
subsequent to providing the key associated with the host to the data storage system, receiving, at a target port of a data storage system, a first login command from the initiator port of the host, wherein the first login command includes the initiator port identifier identifying the initiator port that sent the first login command, wherein the initiator port identifier of the first login command includes the host name uniquely identifying the host and includes the key, wherein the first login command does not include valid login authentication information for the initiator port;
responsive to the data storage system (a) receiving the first login command, (b) determining that the initiator port identifier of the first login command includes the key, and (c) determining that the first login command does not include valid login authentication information for the initiator port, performing first processing including:
recording first information about the first login command in a registration table; and
rejecting the first login command;
subsequent to completing the first processing, receiving, at the target port of the data storage system, a second login command from the initiator port, wherein the second login command includes the initiator port identifier identifying the initiator port that sent the first login command and the second login command, wherein the initiator port identifier of the second login command includes the host name identifying the host and includes the key, wherein the second login command includes valid login authentication information for the initiator port; and
responsive to receiving the second login command that includes valid login authentication information for the initiator port, successfully processing the second login command to log the initiator port into the target port.

10. A non-transitory computer readable medium comprising code stored thereon that, when executed, performs a method of establishing connectivity comprising:

determining a key associated with a host, wherein the key is a user configured string or secret known to the host and a data storage system;

determining a host name uniquely identifying the host;

providing the data storage system with the key associated with the host;

configuring an initiator port identifier that identifies an initiator port of the host, wherein the initiator port identifier includes the key as a first portion and the host name as a second additional portion;

subsequent to providing the key associated with the host to the data storage system, receiving, at a target port of a data storage system, a first login command from the initiator port of the host, wherein the first login command includes the initiator port identifier identifying the initiator port that sent the first login command, wherein the initiator port identifier of the first login command includes the host name uniquely identifying the host and includes the key, wherein the first login command does not include valid login authentication information for the initiator port;

responsive to the data storage system (a) receiving the first login command, (b) determining that the initiator port identifier of the first login command includes the key, and (c) determining that the first login command does not include valid login authentication information for the initiator port, performing first processing including:

recording first information about the first login command in a registration table; and rejecting the first login command;

subsequent to completing the first processing, receiving, at the target port of the data storage system, a second login command from the initiator port, wherein the second login command includes the initiator port identifier identifying the initiator port that sent the first login command and the second login command, wherein the initiator port identifier of the second login command includes the host name identifying the host and includes the key, wherein the second login command includes valid login authentication information for the initiator port; and responsive to receiving the second login command that includes valid login authentication information for the initiator port, successfully processing the second login command to log the initiator port into the target port.

11. The non-transitory computer readable medium of claim 10, wherein the method further comprises:

automatically determining, using the registration table, an initiator group for the host, the initiator group including the initiator port of the host; and creating, using the registration table, a masking view for the host, wherein the initiator group is included in the masking view of the host.

12. The non-transitory computer readable medium of claim 11, wherein the first information recorded in the registration table includes the initiator port identifier and a target port identifier that identifies the target port that received the first login command, wherein the first information is associated with the host in accordance with the host name included in the initiator port identifier.

13. The non-transitory computer readable medium of claim 12, wherein the method further comprises:

automatically determining, using the registration table, a target port group for the host, the target port group including the target port, wherein the target port group is included in the masking view of the host.

14. The non-transitory computer readable medium of claim 13, wherein the masking view includes a storage group of one or more logical devices.

15. The non-transitory computer readable medium of claim 14, wherein the masking view is used by the data storage system to determine whether to service received I/O operations.

16. The non-transitory computer readable medium of claim 10, wherein the valid login authentication information for the initiator port includes a secret known to the host and the data storage system.

* * * * *